(12) United States Patent
Khaitov

(10) Patent No.: US 10,557,582 B1
(45) Date of Patent: Feb. 11, 2020

(54) COUPLER BLOW GUN

(71) Applicant: Coilhose Pneumatics, Inc., East Brunswick, NJ (US)

(72) Inventor: Michael Khaitov, Carteret, NJ (US)

(73) Assignee: Coilhose Pneumatics, Inc., East Brunswick, NJ (US)

(*) Notice: Subject to any disclaimer, the term of this patent is extended or adjusted under 35 U.S.C. 154(b) by 0 days.

(21) Appl. No.: 16/109,128

(22) Filed: Aug. 22, 2018

Related U.S. Application Data

(60) Provisional application No. 62/552,837, filed on Aug. 31, 2017.

(51) Int. Cl.
*F16L 37/28* (2006.01)
*F16K 25/02* (2006.01)

(52) U.S. Cl.
CPC .............. *F16L 37/28* (2013.01); *F16K 25/02* (2013.01); *Y10T 137/87917* (2015.04)

(58) Field of Classification Search
CPC ... F16L 37/28; Y10T 137/87917; F16K 25/02
USPC ....................................................... 137/613
See application file for complete search history.

(56) References Cited

U.S. PATENT DOCUMENTS

| | | | |
|---|---|---|---|
| 2,344,492 A | 3/1944 | Brubaker | |
| 2,716,998 A | 9/1955 | Knasko | |
| 2,869,573 A | 1/1959 | Stafford | |
| 2,880,747 A | 4/1959 | Newcomb | |
| D215,287 S | 9/1969 | Nordeen | |
| 4,078,728 A | 3/1978 | Nordeen | |
| 4,786,029 A * | 11/1988 | Laipply et al. | F16L 37/40 137/614.05 |
| 7,077,162 B2 * | 7/2006 | Burdick | F16K 1/38 137/881 |
| 9,108,474 B2 * | 8/2015 | Chu | B60C 29/068 |

FOREIGN PATENT DOCUMENTS

WO    WO 9001373 A1    2/1990

* cited by examiner

*Primary Examiner* — Kevin L Lee
(74) *Attorney, Agent, or Firm* — Bert P. Krages, II

(57) ABSTRACT

A coupler blowgun having a compact shape which can be used as a quick-release connector with pneumatic tools and also as a blow gun. The spray orifice does not protrude from the wall of the blow gun portion and is actuated by a mechanism such as a button or lever that is located on the opposite side from the spray orifice.

19 Claims, 3 Drawing Sheets

COUPLER BLOW GUN

CROSS-REFERENCED TO RELATED APPLICATIONS

This application claims the benefit of provisional application 62/552,837 which was filed on Aug. 31, 2017 with the US Patent and Trademark Office.

FIELD OF THE INVENTION

The invention relates generally to the field of pneumatic tools and more specifically to quick release couplers and blow guns.

BACKGROUND OF THE INVENTION

Quick-release couplers are commonly used to expedite the attachment of air tools to air hoses by allowing a user to connect and disconnect such tools from hoses in a much faster manner than connecting the threaded end of an air hose to a threaded fitting on the tool. Quick release couplers are generally equipped with a self-sealing valve which automatically contains the compressed air in the hose when the coupler is connected or disconnected from a plug member connector attached to an air tool.

Many air tools, such as sanders and grinders, create dust and debris that need to be cleared from the object being worked. A common way to clear such debris is to use a blow gun to blow the debris from the workspace. Usually, this requires the user to disconnect the air tool and then connect a blow gun in its place. Although quick release couplers offer significant time savings over threaded and flanged connections, it nonetheless takes time to remove an air tool from the coupler, connect and use a blow gun, and then remove the blow gun and reattach the air tool. In addition, the user must also have a means to hold or store the air tool or blow gun when not in use. This is particularly problematic when the user is working in a difficult space, such as on a ladder or under a vehicle.

Prior attempts to combine a coupler with a blow gun, such as that taught by U.S. Pat. No. 4,078,728, have resulted in somewhat bulky fittings that add a noticeable amount of weight over conventional quick release couplers, incorporate protruding nozzles that tend to catch on objects, and have exposed actuating buttons that are subject to inadvertent actuation of the valve that releases compressed air to the nozzle. There is a longstanding need in the field for a compact coupler blow gun that substantially maintains the profile and outer configuration of a quick-release coupler.

SUMMARY OF THE INVENTION

The present invention provides a solution to the problem presented above by incorporating a blow gun portion at the hose end of a quick release coupler. The blow gun portion has a valve that permits a spray of compressed air to exit from an orifice that is flush with the outer wall of the blow gun portion. This valve is connected to a valve stem surrounded by a spring which biases the valve in the closed position. The valve is actuated when the valve stem is moved inwardly by an actuating means. Various types of actuating means are suitable, including a button or lever that push inwardly on the valve stem, a lever or wheel that cause a cam to selectively engage with the valve stem when the lever or wheel are partially rotated, a sliding switch that causes a cam to engage the valve stem when pushed, and a sleeve with a cam on the inner face that rides in a slot on the wall of the blow gun portion and engages the valve stem when the sleeve is moved. Such actuating means should only slightly protrude from the wall of the blow gun portion in order to maintain a compact overall configuration.

A notable feature is that the orifice is located on opposite side of the blow gun portion from the actuating means, and the valve is located between the actuating means and the orifice. This configuration permits the coupler blow gun to retain the generally cylindrical shape of a conventional quick release coupler with only a slight increase in weight and length. Maintaining a length that is only slightly longer than a conventional quick-release coupler enables the connection of an air tool to an air hose to retain almost all the flexibility associated with a conventional coupler which is highly desirable from the perspective of a person using the air tool. Another advantage of this configuration over those that feature blow guns that have nozzles and actuating means that substantially protrude from coupler body is that the present invention is less likely to catch on an obstacle or be inadvertently actuated when the end of the hose is being dragged or pulled around an obstacle.

It should be noted that the phrases "generally cylindrical" and "generally cylindrical configuration" is not to be construed as a shape that is strictly cylindrical. For example, although the cross sections of the coupler and blow gun portions may be circular, they may also be polygonal or even oval. The exterior surfaces of the coupler and blow gun bodies may also have grooves or knurling. However, a generally cylindrical configuration does not include a nozzle that protrudes from the wall of the blow gun portion. To be "generally cylindrical" or to have a "generally cylindrical configuration," the coupler portion and blow gun portion should be similar in diameter or width. Preferably any difference between the largest diameter or width of the coupler and blow gun portions should not exceed 25 percent.

In the preferred embodiment of the invention, the valve actuation means comprises a push button on the top of the unit, which, when depressed, allows air to flow from a recessed orifice at the bottom of the unit. However, other means of actuating the valve may be used such as a small lever that pushes directly down on the end of the valve stem or a lever or wheel that incorporates a cam that causes the valve stem to depress when the lever or the wheel are turned in one direction and which releases the valve stem when it is turned to its original position. It is preferable that the actuating means not protrude from the wall of the blow gun portion by more by more than 5 millimeters to minimize the chance of inadvertent actuation of blow gun valve. In some cases, it may be desirable for the blow gun portion to have a smaller width or diameter than the coupler portion to further minimize this risk.

The coupler portion operates by receiving a plug member that is attached to the compressed air intake port of an air tool. The plug is inserted into the receiving end of the coupler by applying a short pushing motion. Various forms of coupling mechanisms are well known in the art. Common mechanisms such the end of the plug via balls or pins in the coupler that engage a circumferential groove in the plug end of the connector. The balls or pins are held in place by a spring-loaded sleeve on the coupler. Concurrent with the insertion, the end of the plug engages and opens a spring-loaded valve in the coupler which allows compressed air to flow between the passages at opposite ends of the plug and socket. The plug can be disconnected from the coupler by retracting the sleeve on the coupler, which releases the balls or pins and thereby permits the plug to be withdrawn from the coupler. The spring-loaded valve in the coupler then seats against a gasket and prevents compressed air from exiting the coupler.

Blow guns are used to direct a spray of compressed air over a work space. Typically, such spraying is used to clear the work space of debris but may also be done for other purposes such as cooling a surface or encouraging evaporation. The present invention incorporates a blow gun feature that can be used irrespective of whether a tool is connected or disconnected to the coupler. This obviates the need to carry a separate blow gun and saves time that would otherwise be spent changing the tool to connect a separate blow gun.

An advantage of having the orifice on the opposite side of the valve actuating means is that it allows the user to aim the spray more accurately and to use the thumb to actuate the valve more precisely than can be done when the orifice is on the same side as actuation means. Another advantage is that it facilitates the placement of the user's hand on the side opposite from the orifice, which in some instances is a more protected position. For example, using a tool such as an air grinder can cause the surface being worked on to become extremely hot and able to burn skin and clothing if touched. Having the orifice and the actuating means on opposite sides results in a configuration that minimizes the distance between the user's skin and the work surface and thus reduces the chance of injury.

Preferably, the orifice of the blow gun portion is located within a recessed space on the exterior surface of the coupler that permits the air spray to vent laterally in the event the user places a finger in front of the orifice. An example of such a recessed space is a groove that encircles the coupler at the portion where the outlet of the orifice is located. A provision for venting is important to prevent the situation where a high-pressure stream of compressed air breaks through the user's skin and enters the body. On such occasions, it is possible for compressed air to enter the blood stream and cause a dangerous medical condition called an embolism.

Another advantage of the present invention is that body of the blow gun portion is highly suitable for economical manufacturing by computer numerical control (CNC) machining, particularly when machined from hexagonal rods of metals such as brass or stainless steel. CNC machining not only permits tighter tolerances than alternative methods such as die casting, it also results in a "machined finish" that is generally more appealing to customers. Other configurations, such as blow gun bodies with protruding nozzles, cannot be as economically manufactured by CNC machining and are generally manufactured by die casting followed by additional machining steps such as tapping threads into the casting.

DESCRIPTION OF THE PREFERRED EMBODIMENT

Figure 1:
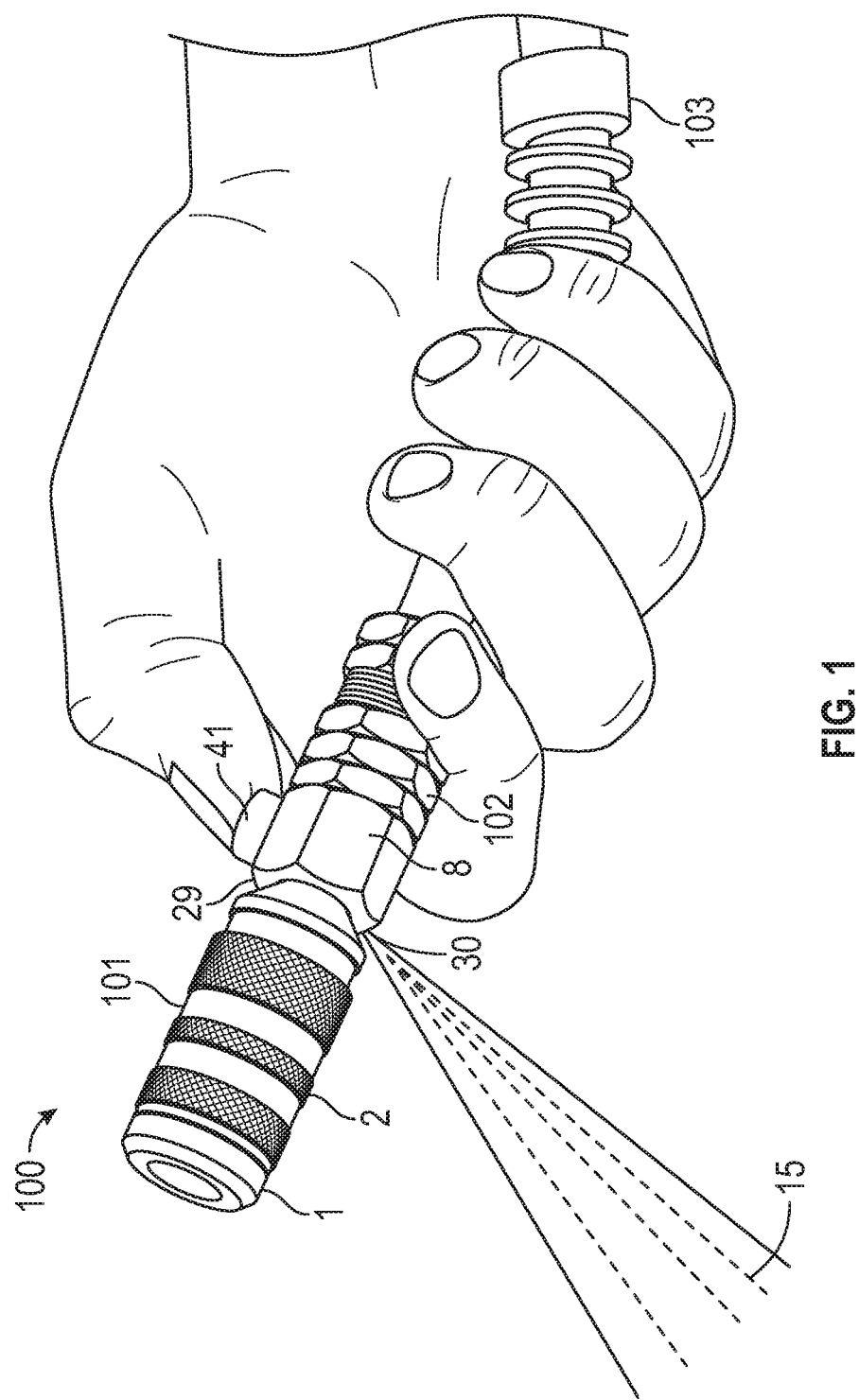
FIG. 1 is a perspective view showing the coupler blow gun assembly with the blow gun feature in use.

The coupler blow gun assembly 100 is shown in FIG. 1. The assembly 100 has a coupler portion 101 located at the anterior end of the assembly and a blow gun portion 102 located at the posterior end. In typical use, the blow gun portion 102 is attached to a hose 103 which in turn is connected to a source of compressed air such as an air compressor. When the button 41 is pressed downward, a spray of air 15 is released from the orifice 30. The blow gun body 8 preferably has a groove 29 whose purpose is to allow the spray 15 to vent around an obstruction in front of the orifice passage 30, such as a finger.

The coupler portion 101 contains a sleeve 2 that resides around a coupler body 1 that in turn is attached to the blow gun body 102. Various kinds of pneumatic tools may be selectively connected or disconnected from the coupler portion 101 by means of a plug member (not shown) attached to the inlet end of an air tool, in which the plug member is configured to be inserted into and retained by the coupler portion 101. The coupler portion 101 can comprise any of a variety of quick connect mechanisms, which are well known in the art. Specific examples include ball lock, pin lock, roller lock, ring lock, and cam lock mechanisms. Quick release couplers typically use some form of check valve to ensure that air does not escape from the hose 103. Examples of such valves include ball checks, poppet valves, and sliding sleeves. A notable feature of the coupler blowgun assembly 100 is that the orifice passage 30 is located on the opposite side from the button 41 that actuates the valve (shown in FIGS. 2 and 4) and thus releasing an air spray 15. This has the advantage of directing the air spray 15 in a opposite direction from the user in normal use.

Figure 2:
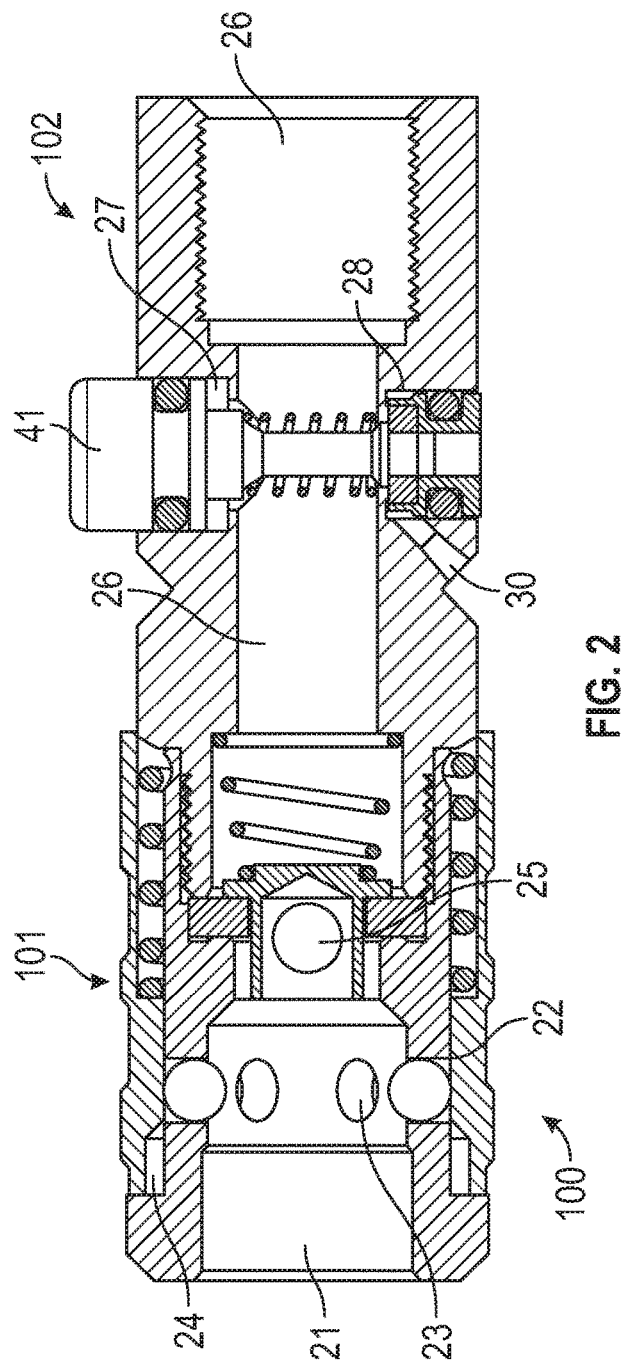
FIG. 2 is a longitudinal-sectional view showing the coupler blow gun assembly.

FIG. 2 shows a coupler blow gun assembly 100 in which the coupler portion 101 has a ball lock mechanism, which is the preferred embodiment. A longitudinal air passage 26 runs through the blow gun portion 102 to a poppet 4 which separates the longitudinal passage 26 from the air passage 21 in the coupler portion 101. The coupler body 1 is a hollow member with a generally cylindrical configuration and has an air passage 21 in which steel balls 3 reside above openings 23. Steel balls reside in a groove and are retained in placed by a sleeve 2 that encircles the coupler body 1. A spring 6 biases the sleeve 2 in a forward position which causes the steel balls 3 to be pressed into openings 23. When the steel balls 3 are thus positioned, the portions of the balls 3 inside the air passage 23 engage a groove in the plug member (not shown) and hold the plug member onto the coupling assembly 100. When the sleeve is pulled back from the forward position, a gap 24 in the sleeve 2 permits the steel balls 3 to disengage from the openings 23 and thus permit the plug member to be pulled away from the coupler assembly 100 which results in disconnecting the air tool from the assembly 100.

The coupler portion 101 is fitted with a poppet 4 which is encircled by a rubber washer 5 and biased into a closed position by a spring 7. When a plug member is inserted into the coupler portion 101, the end of the plug pushes the poppet 4 inward and thus allows compressed air to flow through an opening 25 and creates a fluid communication between the compressed air source and the air tool. When the plug member is detached from the coupler portion 101, the poppet 4 is pushed into a closed position causing the opening 25 to lose communication with the air passage 26 and preventing compressed air from escaping from the coupler portion 101. Both air passages 21 and 26 share a longitudinal axis and the coupler portion 101 and the blow gun portion 102 have an in-line configuration.

Figure 3:
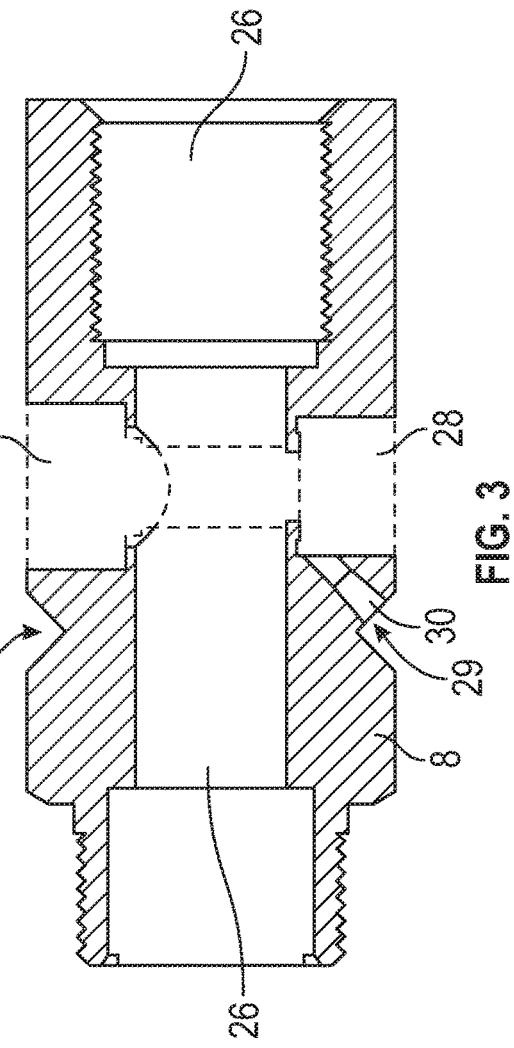
FIG. 3 is a longitudinal-sectional view showing the blow gun body.

FIG. 3 shows the blow gun body 8 having a longitudinal air passage 26. A first cylindrical opening 27 is located on the top side of the blow gun body 8 and is in communication with the air passage 26. A second cylindrical opening 28 is located on the bottom side of the blow gun body 8 immediately below the first cylindrical opening 27 and is also in communication with the air passage 26. A groove 29 encircles the outer portion of the blow gun body 8 which is connected to the upper portion of the second cylindrical opening 28 by the orifice passage 30.

Figure 4:
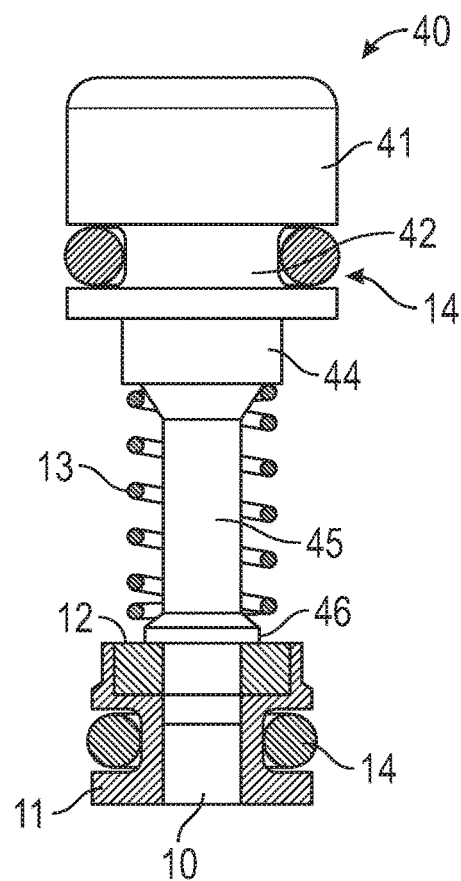
FIG. 4 is a sectional view showing the blow gun pin assembly.

FIG. 4 show the blow gun pin assembly 40. A button 41 is located at the top of the pin assembly 40 which has a groove 42 in the lower portion in which an o-ring 14 is retained. The button 41 connects with an upper collar portion 44 which in turn connects to a shaft 45 which connects to a lower collar portion 46 which connects to a pin portion 10. A valve spring 13 is located around the valve stem 45 between the upper collar portion 44 and the lower collar portion 46. A valve 11 is attached to the pin portion 10 by means such as a press fit, threads, or adhesive and is configured to receive a rubber washer 12 at the top of the valve and an o-ring 14 in the middle portion.

As shown in FIG. 2, the blow gun pin assembly 40 is fitted into the blow gun body 8. When downward pressure is placed on the button 41 the blow gun pin assembly 40 is forced downwards such that upper portion of the valve 11 moves beneath the entrance to the orifice passage 30 thus causing the primary air passage 26 to be in communication with the secondary air passage 28 and simultaneously causing the secondary air passage 28 to be in communication with the orifice passage 30. As a result of the communication between the orifice passage 30, secondary air passage 28, and primary air passage 26, compressed air flows through the orifice passage 30 and exits from the blow gun portion 102. When the downward pressure on the button 41 is removed, the valve spring 13 decompresses and pushes the blow gun pin assembly 40 upwards. This causes the valve 11 to occlude the orifice passage 30 and thus cut off the communication between the orifice passage 30 and the air passage 28 which in turn prevent the entry of compressed air into the orifice passage 30.

Returning to FIG. 1, it can be seen that the groove 29 serves the safety purpose of preventing a user's skin from contacting the outer part of the orifice passage 30. This reduces the risk of a high-pressure stream of compressed air breaking through the user's skin and entering the body. Another advantage of the present invention is the coupler blow gun assembly 100 has a compact cross section that is only marginally longer than a conventional quick release coupler. In addition, the assembly 100 is easier and less expensive to manufacture than prior art examples such as that taught by U.S. Pat. No. 4,078,278.

Figure 5:
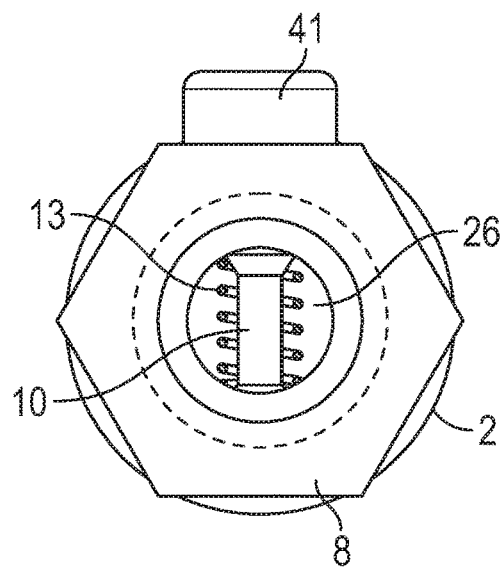
FIG. 5 is a view from the inlet end of the blow gun portion.

FIG. 5 shows that, in the preferred embodiment, the wall of the blow gun body 8 is hexagonal in cross-section when viewed from the inlet end and that the width of the blow gun body 8 at its widest part is nearly equal to the diameter of the sleeve 2. To maintain a compact shape, it is desirable that the difference between the diameter of the sleeve and the width of the blow gun party not exceed 25 percent of the outer diameter of the sleeve 2. For similar reasons, it is desirable that the button 41 not protrude more than 5 millimeters from the surface of the valve body 8.

As would be apparent to a person skilled in the art, a number of variations and modifications can be made to the invention described above without departing from its spirit and scope.

The invention claimed is:

1. A coupler blow gun assembly comprising:
a quick release connector portion having a main flow outlet and having a generally cylindrical configuration;
a blow gun portion having a main flow inlet and a generally cylindrical body having an exterior surface;
a first fluid passage that runs from the main flow inlet to a first valve in the quick release connector portion;
a second fluid passage that runs from the first valve to the main flow outlet;
a first recess in the body of the blow gun portion;
a first opening at the base of the first recess connecting the first recess to the first fluid passage;
a second recess in the body of the blow gun portion that is on the opposite side from the first recess;
a second opening at the base of the second recess connecting the second recess to the first fluid passage, said second opening being opposite from the first opening;
an orifice passage passing from the exterior surface of the blow gun portion to the second recess;
a valve stem having a first end that passes through the first opening and a second end that passes through the second opening, said first end connected to or configured to engage an actuating means located in or proximate to the first recess and said second end connected to a valve member located in the second recess;
wherein said actuating means is configured to selectively depress the first end of the valve stem;
and further wherein said valve member and the second recess are configured to prevent communication of the first fluid passage with the second recess when the actuating means is in a not-depressed position and to provide communication of the first fluid passage with the second recess and concurrent communication of the second recess with the orifice passage when the valve stem is in a depressed position.

2. The coupler blow gun assembly of claim 1 in which the first fluid passage and the second fluid passage are aligned along a longitudinal axis.

3. The coupler blow gun assembly of claim 1 in which the actuating means is a button.

4. The coupler blow gun assembly of claim 1 in which the actuating means incorporates a cam configured to selectively engage the valve stem.

5. The coupler blow gun assembly of claim 1 in which the actuating means is biased into the not-depressed position by a spring that encircles the valve stem and is located in the first fluid passage.

6. The coupler blow gun assembly of claim 1 in which the difference between the longest cross-sectional diameter or width of the quick-release connector portion and the longest cross-sectional diameter or width of the body of the blow gun portion does not exceed 25 percent of the cross-sectional diameter or width of the quick-release connector portion.

7. The coupler blow gun assembly of claim 1 in which the orifice passage terminates within a third recess on the exterior surface of the blow gun portion and does not reside in a nozzle.

8. The coupler blow gun assembly of claim 1 in which the orifice passage terminates within a groove on the exterior surface of the blow gun portion.

9. The coupler blow gun assembly of claim 1 in which the orifice passage does not reside in a nozzle.

10. The coupler blow gun of claim 1 in which the actuating means does not protrude more than 5 millimeters from the exterior surface of the body of the blow gun portion.

11. A coupler blow gun assembly comprising:
a quick release connector portion having a main flow outlet, having a circular cross-section, a distal end at the main flow outlet, and a proximal end opposite from the distal end;
a blow gun portion having a main flow inlet, and a wall having a hexagonal cross section from the main flow inlet to the proximal end of the quick release connector;
a first fluid passage that runs from the main flow inlet to a first valve in the quick release connector portion;
a second fluid passage that runs from the first valve to the main flow outlet;
in which the first fluid passage and the second fluid passage are aligned along a longitudinal axis;
further having a first recess in the outer part of the wall of the blow gun portion;
a first opening at the base of the first recess connecting the first recess to the first fluid passage;
a second recess in the outer part of the wall of the blow gun portion that is on the opposite side of the wall of the blow gun portion from the first recess;
a second opening at the base of the second recess connecting the second recess to the first fluid passage, said second opening being opposite from the first opening;
a third fluid passage passing through the wall of the blow gun portion having a secondary flow inlet located in the second recess and a secondary flow outlet located at the outer portion of the wall of the blow gun portion;
a valve stem having a first end that passes through the first opening and a second end that passes through the second opening, said first end connected to or configured to engage an actuating means located in the first recess and said second end connected to a valve member located in the second recess;
wherein said actuating means is configured to selectively depress the first end of the valve stem;
and further wherein said valve member and the second recess are configured to prevent communication of the first fluid passage with the secondary inlet when the actuating means is in a not-depressed position and to provide communication of the first fluid passage and the secondary flow inlet when the valve stem is in a depressed position.

12. The coupler blow gun assembly of claim 11 in which the actuating means incorporates a cam configured to selectively engage the valve stem.

13. The coupler blow gun assembly of claim 11 in which the actuating means is biased into the not-depressed position by a spring that encircles the valve stem and is located in the first fluid passage.

14. The coupler blow gun assembly of claim 11 in which the difference between the cross-sectional diameter of the quick-release connector portion and the widest cross-sectional width of the wall of the blow gun portion does not exceed 25 percent of the diameter of the quick-release connector portion.

15. The coupler blow gun assembly of claim 11 in which the secondary fluid outlet is located within a recess on the wall of the blow gun portion and does not reside in a nozzle.

16. The coupler blow gun assembly of claim 11 in which the secondary fluid outlet is located within a groove in the wall of the blow gun portion.

17. The coupler blow gun assembly of claim 11 in which the length of the third fluid passage is equal to or less than 1.42 times the thickness of the outer wall of the blow gun portion.

18. The coupler blow gun of claim 11 in which the actuating means does not protrude more than 5 millimeters from the wall of the blow gun portion.

19. A coupler blow gun assembly comprising:
a quick release connector portion having a main flow outlet and having a circular cross-section;
a blow gun portion having a main flow inlet and a wall having a hexagonal cross section;
a first fluid passage that runs from the main flow inlet to a first valve in the quick release connector portion;
a second fluid passage that runs from the first valve to the main flow outlet;
in which the first fluid passage and the second fluid passage are aligned along a longitudinal axis;
further having a first recess in the outer part of the wall of the blow gun portion;
a first opening at the base of the first recess connecting the first recess to the first fluid passage;
a second recess in the outer part of the wall of the blow gun portion that is on the opposite side of the wall of the blow gun portion from the first recess;
a second opening at the base of the second recess connecting the second recess to the first fluid passage, said second opening being opposite from the first opening;
a third fluid passage passing through the wall of the blow gun portion having a secondary flow inlet located in the second recess and a secondary flow outlet located within a groove on the outer portion of the wall of the blow gun portion;
a valve stem having a first end that passes through the first opening and a second end that passes through the second opening, said first end connected to a button located in the first recess and said second end connected to a valve member located in the second recess;
wherein said button is configured to selectively depress the first end of the valve stem and further wherein said valve member and the second recess are configured to prevent communication of the first fluid passage with the secondary inlet when the button is in a not-depressed position and to provide communication of the first fluid passage and the secondary flow inlet when the valve stem is in a depressed position.

* * * * *